(12) United States Patent
Cappello et al.

(10) Patent No.: US 11,941,772 B2
(45) Date of Patent: Mar. 26, 2024

(54) METHOD AND SYSTEM FOR GENERATING A 3D RECONSTRUCTION OF A HUMAN

(71) Applicant: Sony Interactive Entertainment Inc., Tokyo (JP)

(72) Inventors: Fabio Cappello, London (GB); Nigel John Williams, London (GB); Rajeev Gupta, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 174 days.

(21) Appl. No.: 17/273,573

(22) PCT Filed: Sep. 4, 2019

(86) PCT No.: PCT/GB2019/052457
§ 371 (c)(1),
(2) Date: Mar. 4, 2021

(87) PCT Pub. No.: WO2020/053551
PCT Pub. Date: Mar. 19, 2020

(65) Prior Publication Data
US 2021/0256776 A1 Aug. 19, 2021

(30) Foreign Application Priority Data
Sep. 12, 2018 (GB) ..................... 1814835

(51) Int. Cl.
*G06T 19/20* (2011.01)
*G06N 3/04* (2023.01)
(Continued)

(52) U.S. Cl.
CPC ............. *G06T 19/20* (2013.01); *G06N 3/04* (2013.01); *G06N 3/08* (2013.01); *G06T 7/10* (2017.01);
(Continued)

(58) Field of Classification Search
CPC . G06N 3/04; G06N 3/08; G06T 15/04; G06T 17/00; G06T 19/20; G06T 2200/08;
(Continued)

(56) References Cited

U.S. PATENT DOCUMENTS 10,529,137 B1 * 1/2020 Black ................... G06V 40/103
11,461,630 B1 * 10/2022 Black ..................... G06Q 50/01
(Continued)

OTHER PUBLICATIONS

Combined Search and Examination Report for corresponding GB Application No. 1814835.3, 5 pages, dated Mar. 13, 2019.
(Continued)

*Primary Examiner* — Sing-Wai Wu
(74) *Attorney, Agent, or Firm* — Matthew B. Dernier, Esq.

(57) ABSTRACT

A method of generating a three-dimensional (3D) reconstruction of a human includes obtaining at least one colour image and corresponding depth image of a scene comprising a human subject that is at least partially occluded by one or more items. The regions in the at least one colour image corresponding to a human subject are identified. A point cloud of the scene is generated based on the at least one colour image and corresponding depth image. One or more parameters of a parametric model are then adjusted based on the regions of the point cloud identified as corresponding to the human subject. The adjusted parametric model is then used to generate a 3D reconstruction of the human subject; where the parametric model provides an estimate for points in the point cloud corresponding to the occluded parts of the human subject. A corresponding system is also provided.

15 Claims, 5 Drawing Sheets

(51) Int. Cl.
*G06N 3/08* (2023.01)
*G06T 7/10* (2017.01)
*G06T 7/50* (2017.01)
*G06T 7/90* (2017.01)
*G06T 15/04* (2011.01)
*G06T 17/00* (2006.01)

(52) U.S. Cl.
CPC .................. *G06T 7/50* (2017.01); *G06T 7/90* (2017.01); *G06T 15/04* (2013.01); *G06T 17/00* (2013.01); *G06T 2200/08* (2013.01); *G06T 2207/10024* (2013.01); *G06T 2207/20084* (2013.01); *G06T 2207/30196* (2013.01); *G06T 2219/2021* (2013.01)

(58) Field of Classification Search
CPC . G06T 2207/10024; G06T 2207/20084; G06T 2207/30196; G06T 2219/2021; G06T 7/10; G06T 7/50; G06T 7/90; G06T 2207/10028; G06T 5/005
See application file for complete search history.

(56) References Cited

U.S. PATENT DOCUMENTS

| | | |
|---|---|---|
| 2009/0252423 A1 | 10/2009 | Zhu |
| 2010/0111370 A1* | 5/2010 | Black .................. G06V 10/763 |
| | | 705/26.1 |
| 2010/0215257 A1 | 8/2010 | Dariush |
| 2010/0303302 A1 | 12/2010 | Kipman |
| 2014/0177944 A1 | 6/2014 | Kutliroff |
| 2014/0229839 A1* | 8/2014 | Lynch .................. G06F 3/0482 |
| | | 715/736 |
| 2015/0227680 A1* | 8/2015 | Mainkar ................ G06T 17/00 |
| | | 703/11 |
| 2016/0253807 A1 | 9/2016 | Jones |
| 2016/0266256 A1* | 9/2016 | Allen ..................... G01C 21/26 |

OTHER PUBLICATIONS

International Search Report on Patentability and Written Opinion for corresponding PCT Application No. PCT/GB2019/052457, 14 pages, dated Dec. 10, 2019.
Bogo Federica, et al., "Detailed Full Body Reconstruction of Moving People from Monoculare RGB-D Sequences" EEE International Conference on Computer Vision, 9 pages, Dec. 7, 2015.
Kyungjae Lee, et al., "Efficient Depth Enhancement Using a Combination of Color and Depth Information" Sensors, vol. 17, No. 7, 27 pages, dated Jul. 1, 2017.
Chandra Siddhartha, et al., "Accurate Human-Limb Segmentation in RGB-D Images for Interlligent Mobility Assistance Robots" IEEE International Conference on Computer Vision Workshop, pp. 436-442, Dec. 7, 2015.

* cited by examiner

METHOD AND SYSTEM FOR GENERATING A 3D RECONSTRUCTION OF A HUMAN

TECHNICAL FIELD

The present disclosure relates to a method and system for reconstructing a human in 3D.

BACKGROUND

There are numerous applications in which it may be desirable to represent a human graphically in three dimensions. In one example, this might involve generating an avatar of a player in a video game, where the physical appearance of the avatar corresponds to the real-life, actual physical appearance of the player. The likeness of the player with their avatar may improve the player's feeling of presence within the game whilst also providing the player with a personal connection to it.

In multiplayer video games, where for example, a player is playing with their friend remotely, the likeness of the friend's avatar to the friend's actual, physical appearance may serve in making both players feel as if the other is physically present. This may particularly be the case, where for example, both players are represented in a virtual reality, with e.g. the movements and facial expressions of the players being represented in the virtual reality. Virtual reality applications are often criticized for being anti-social, since the user is usually completely cut off from the real, outside world.

Current methods for reconstructing humans in 3D include the capture of colour and depth images, so as to form a point cloud. The point cloud is used to generate a mesh representing the human, to which surface texture is then added. Whilst the generation of point clouds preserves a lot of detail, problems may arise where colour and or depth information is missing due to e.g. parts of the human being occluded in the captured colour and depth images.

Other known methods for reconstructing humans in 3D involve the use of deformable model fitting. In these methods, a parametrized model representing the generic shape of a human is morphed so as to correspond to the human in a captured colour image. Typically, this involves identifying a plurality of feature points in the captured colour image and morphing the model based on the identified feature points. However, in these methods, any parts of the human occluded by e.g. hair or clothing cannot be represented using the deformable model, thus resulting in a loss of detail.

The present invention seeks to alleviate these problems.

SUMMARY

According to a first aspect disclosed herein, there is provided a method according to claim 1.

According to a second aspect disclosed herein, there is provided a system according to claim 12.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
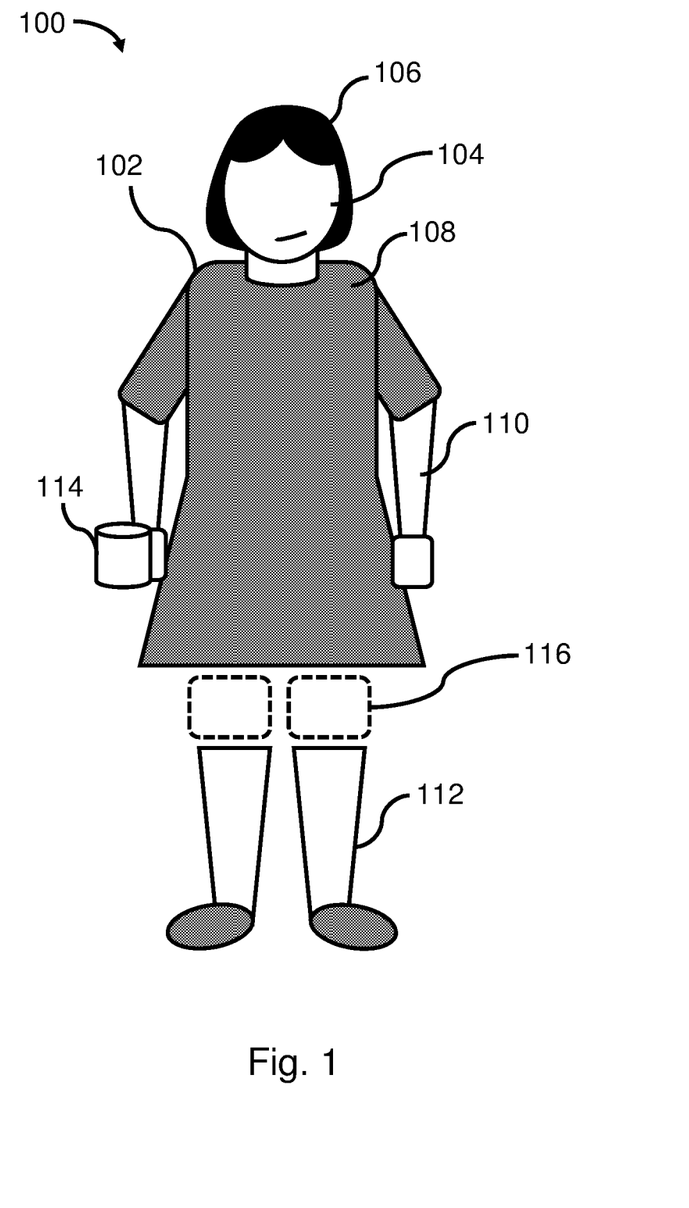
FIG. 1 shows schematically an example of a point cloud of a human subject.

FIG. 1 shows schematically an example of a point cloud 100 from a respective viewpoint.

In FIG. 1, the subject of the point cloud corresponds to a human 102 shown from a head-on view. It will be appreciated that, in FIG. 1, the point cloud is of a sufficient density such that the human 102 appears as having a solid outline. In other examples, the point cloud may be sparser, and therefore appear as a plurality of distinct points with no distinct edge.

In FIG. 1, it can be seen that the human has a face 104, at least part of which is occluded by hair 106. The body of the human is also shown as at least being partially occluded by clothing 108. Other parts of the human body, such as the arms 110 and legs 112 are shown as not being occluded by clothing. In FIG. 1, the right hand (from the perspective of the human subject) is shown holding a mug 114.

In FIG. 1, it can be seen that there is a region 116 for which colour and depth information (and therefore respective points in the point cloud) is missing. This information may be missing due to those parts having been occluded in the at least one colour and depth images that were captured of the human subject. This occlusion may have occurred as a result of the position and orientation of the camera(s) used to capture the colour and depth images. For example, less of the human's legs will be occluded by the dress 108 as the height of the camera is lowered relative to the human. Correcting this via capturing more images from different respective camera angles may be a somewhat burdensome process for the developer or engineer that intends to reconstruct a 3D representation of the human. In some cases, it may not even be apparent that colour information is missing for those parts, until the point cloud has been generated.

Figure 2:
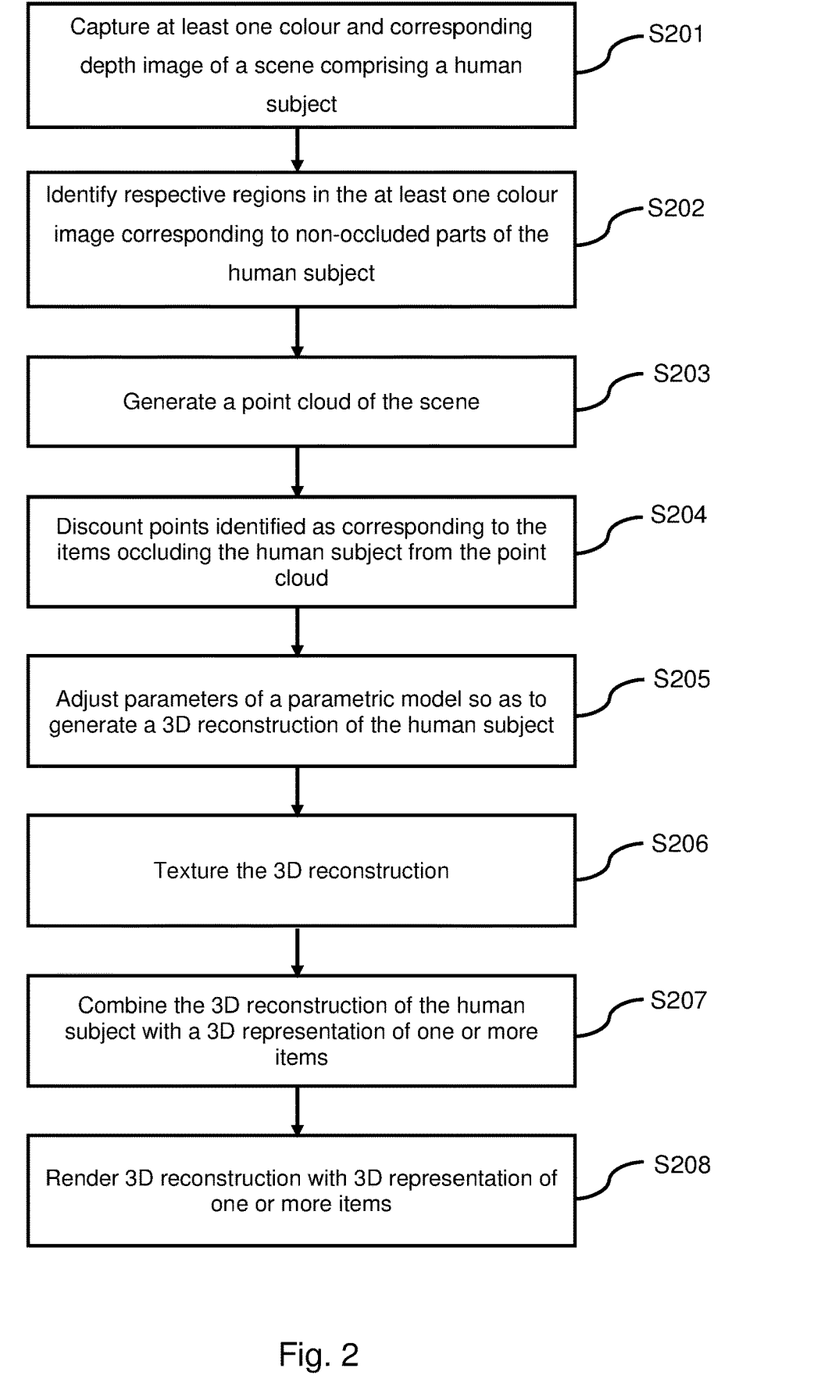
FIG. 2 shows a flowchart for generating a 3D reconstruction of a human subject.

A method for generating a reconstruction of a human subject, including any occluded parts, will be now described in relation to FIG. 2.

At a first step S201 of this method, at least one colour image and corresponding depth image of a scene is obtained for a respective viewpoint. The at least one colour image and corresponding depth image may be captured by a colour camera and depth camera respectively. In some examples, these cameras may be included in a single device, such as, for example, the Microsoft Kinect™ device. The image captured by the colour and depth cameras may correspond to an RGB-D image, for example. In preferred examples, there is substantial overlap between the portions of the scene captured by the respective colour and depth cameras. In some cases, the colour image may be cropped to match the extent of the scene captured in the depth image (or vice versa).

In some embodiments, there may be no separate depth camera and the colour camera may be configured to capture a stereoscopic image. The depth image may then be obtained from this stereoscopic image. Techniques for generating depth images from stereoscopic images are known in the art (e.g. using triangulation) and need not be described further herein.

A device such as a Sony® Playstation 4® obtains this least one colour image and corresponding depth image, or a stereo image (from which a depth image may be obtained by suitable processing), either from such connected camera(s) or optionally from another source, such as a previously captured image or images from the same camera, or from another device, such as a phone.

The scene includes a human subject, which forms the subject of the at least one colour and depth images. The human subject may correspond to the human subject shown previously, in FIG. 1. Generally, it is expected that the human subject will be at least partially occluded in the obtained colour and depth images. This occlusion may correspond to items that the human is holding, clothes and or jewellery that the human is wearing, hair on the user's face or body, furniture in the scene located between the user and the camera(s), etc. Here, the human may be said to be occluded in the sense that there is a part of the human's body (and face) for which colour and depth information has not been obtained.

In preferred embodiments, a plurality of colour and depth images of the scene are obtained, with each colour and depth image pair being obtained for a different respective viewpoint. It is desirable to obtain (e.g. capture) a greater number of colour and depth images because this means that more colour and depth information is available for use in reconstructing the human subject graphically in 3D. Generally, obtaining three or four colour and depth images, covering 360 degrees of the human subject should result in a sufficient amount of colour and depth information for use in the present method. These colour and depth images may be obtained by moving around the human subject, and capturing colour and depth images of the human subject, at different respective positions.

At step S202, regions in the at least one colour image corresponding to the non-occluded parts of the human subject are identified. The regions corresponding to the one or more items occluding the human subject may also be identified. Again, these items may correspond to the human subject's hair, items that the human subject is holding or carrying, furniture present in the scene, etc. The different regions in the image may be identified using image segmentation.

The image segmentation may be performed using deep learning. In one example, a neural network such as a convolutional or fully convolutional neural network (CNN or FCNN) may be trained to identify regions within colour images corresponding to humans. The neural network may be trained with colour images in which the regions corresponding to humans are labelled, for example. In some examples, it may be that the neural network is also trained to identify regions in the at least one colour image corresponding to the one or more items occluding the human subject. Again, the neural network may be trained with colour images in which the regions corresponding to a human subject are labelled, along with the one or more items occluding the human subject also being labelled (i.e. supervised learning). In either case, once sufficiently trained, the neural network may be used to perform the image segmentation. Examples of known deep networks that perform image segmentation include 'AlexNet', 'VGG-16', 'GoogLeNet', 'ResNet', etc.

In other examples, the image segmentation may be performed using clustering analysis. For example, a k-means algorithm may be used to identify regions in the at least one colour image that correspond to the human subject and regions that correspond to one or more items occluding the human subject. These respective regions may be identified based e.g. on a relative homogeneity in colour, for example. Other methods for performing image segmentation may also be used in the present method, such as template matching or the like, by way of a non-limiting example.

In embodiments where multiple colour images are captured, the image segmentation may be performed on at least some, if not all, of the captured colour images. The reasons for wanting to segment the different regions of the colour image (or images) will become apparent from the steps describe further, below.

The image segmentation may also be used to identify regions in the colour and depth images corresponding to the background, i.e. not the human subject. These regions may be removed before generating a point cloud of the scene. This may reduce the amount of processing of the point cloud that is subsequently required. In other embodiments, the regions corresponding to the background may be removed after the point cloud has been generated (as part of the subtraction step, described later).

At step S203, a point cloud of the scene (including the human subject) is using the at least one colour image and corresponding depth image. The point cloud may be generated by applying an inverse projection to the colour and depth images. The term 'inverse' here describes the mapping of points (i.e. pixels) in the 2D colour and depth images to points in a 3D coordinate system (whereas conventionally, a camera matrix is used to transform points in the 3D real-world into the 2D image plane).

The inverse projection may be determined using the colour and depth pixel values in the colour and depth images, and the extrinsic and intrinsic parameters of the colour and depth cameras. Techniques for generating point clouds from RGB-D images are generally known in the art and any of these may be employed in the present disclosure. If no depth camera is used (as described previously), then the inverse projection may be determined using the parameters of the colour camera, which in this case, would be configured to capture a stereoscopic image.

If multiple colour and depth image pairs are captured, i.e. from different respective viewpoints, the inverse mapping is used to map each pixel in each image to a point in the common 3D coordinate system. In some cases, it may be that the same point in the scene is captured multiple times from different perspectives in the colour and depth images. It may therefore be desirable to check, prior to applying the inverse projection, whether a corresponding point in the point cloud already exists for a given set of colour and depth pixels. If there is an existing point in the point cloud, the mapping may be limited to just those colour and depth pixels for which there are no existing points in the point cloud.

At step S204, points identified as corresponding to the one or more items occluding the human subject are discounted from the point cloud. The discounting of the points may involve subtracting them from the point cloud or identifying them as being distinct from the points in the point cloud corresponding to the human subject. These points may correspond to e.g. objects that the human subject is holding, accessories that the human subject is wearing, the human subject's hair, etc. These points may be identified using the image segmentation described previously.

Figure 3:
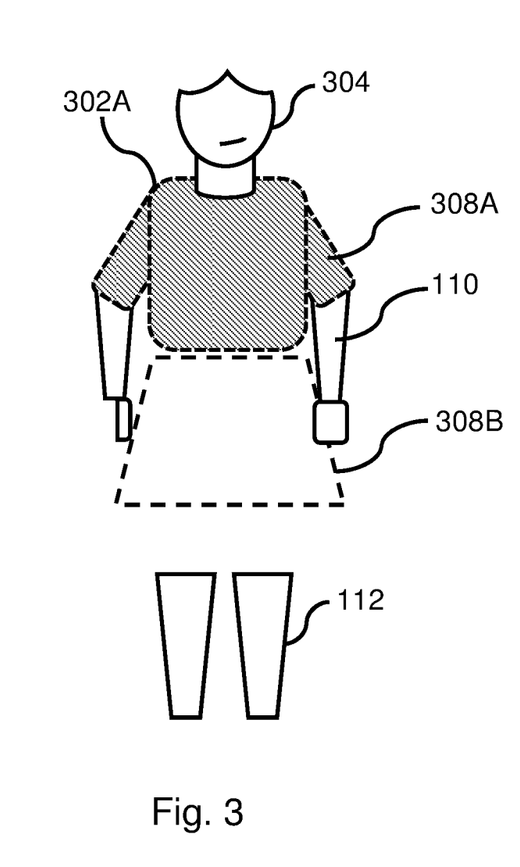
FIG. 3 shows schematically an example of a point cloud of a human subject, following a subtraction operation.

An example of the points that may remain in the point cloud following the discounting is shown in FIG. 3 (from a head-on perspective). As can be seen in FIG. 3, only the parts of the human subject corresponding to the face minus the hair 304, the arms 110, hands, lower legs 112, and the human subject's clothing 108 are represented by points in the point cloud.

In some examples, some of the clothing may be identified as not contributing to the outline of the human subject. For example, the top 308A and skirt 308B may be identified as separate regions, with the skirt being identified as not corresponding to the overall shape of the human subject's body. In such a case, the points corresponding to the skirt 308B may be removed from the point cloud. The points corresponding to the top 308A (being e.g. tighter fitted) may be kept as being representative of the human subject's build. In other examples, simply all of the points identified as occluding the human subject's body may be removed from the point cloud. In these examples, only the points corresponding to the exposed parts of the human subject's body would be kept.

Optionally, the user may specify whether an item of clothing is representative of their physique, for example by allowing the user to approve or disapprove of an item, when shown in a segmented manner similar to that seen in FIG. 3. Further optionally, items identified as diverging from a human subject's build by more than a threshold amount may be excluded from such approval/selection.

It will also be appreciated that the data associated with generating the model of the user may be associated with a user's account, so that when a user indicates that all or part of their clothed model is representative of their physique, then this may be stored as the current best data for the user. This may also be done automatically, on the basis that a point cloud corresponding to more form-fitting or figure-hugging clothing will occupy a smaller apparent volume for the same user than a point cloud based on looser clothing; accordingly, the apparent volume of parts of the user's clothed body may be compared to a previously stored representation and the stored data may be replaced if the current volume is smaller (once any scaling due to conditions at capture and the like is normalised).

In some cases, there may be gaps in the point cloud of the human subject, as a result of the subtraction. For example, if the point cloud included the human subject e.g. holding a mug or wearing a hat, removal of these points will result in 'holes' where parts of the human subject were occluded by the objects (e.g. the hand in the case of the mug, or the top of the head in the case of a hat). In such cases, these holes may be filled in using a depth completion method. This may take the form of interpolating a surface (e.g. a layer of points) between known portions of the point cloud, and/or using some or all of a male or female baseline model, scaling it or adjusting model parameters to minimise the distance between known points and the surface of the model, and then map portions of the model to corresponding missing areas of the point cloud. Alternatively or in addition, a model of the user generated according to the techniques described herein may be used as the baseline model to iterate a more refined model at this stage. In one example, the depth completion method may comprise bilateral filtering. In additional or alternative examples, the depth completion may involve using a deep network to identify surface normals and occlusion boundaries in the captured colour and depth images, as is outlined in 'Deep Depth Completion of a Single RGB-D Image', Y. Zhang, T. Funkhouser, Hiroshi Ishikawa, Princeton University, pages 1-11, which is incorporated herein by reference.

At step S205, the regions of the point cloud corresponding to the non-occluded parts of the point cloud are used to adjust one or more parameters of a parametric model. The parametric model defines a 3D parametrised shape of a generic human, with the parameters being adjustable so as to morph the model to correspond more closely to a desired human subject.

The adjustment of the one or more parameters may be based on processing of the point cloud, following the discounting. The processing may involve, for example, extracting a plurality of feature points from the point cloud that uniquely identify the human subject, and adjusting one or more parameters of the parametric model, so that the model exhibits the extracted feature points. The extracted feature points may include e.g. the relative location (in 3D) of the human subject's eyes, nose, mouth, jaw as well as the relative location of any joints such as the user's elbows, knees, wrist, etc.

As described previously in relation to FIG. 1, there may be parts of the human subject for which colour and depth information is missing due to occlusion. These parts may be occluded as a result of the respective viewpoint(s) from which the colour and depth images were captured. For example, in FIG. 1, it was shown that a gap in the human subject's legs (missing regions 116) might result as a result of the relative height from which the colour and depth images were captured. These kinds of occlusions may be difficult to anticipate compared with say, the human subject's hair or clothing which can readily be identified (by eye) as occluding the human subject. In some cases, it may only become apparent that such occlusion has occurred after having reviewed the colour and depth images, or the point cloud generated therefrom.

Figure 4:
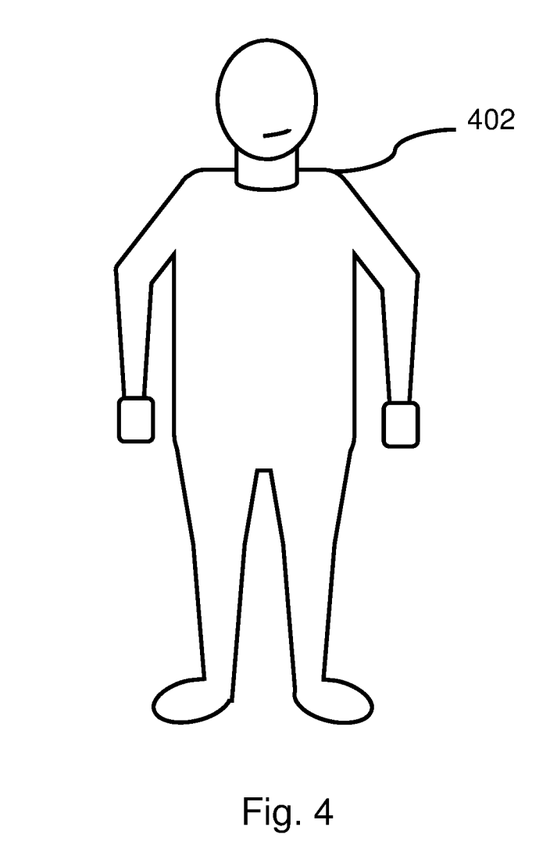
FIG. 4 shows schematically an example of an adjusted parametric model representing the human subject.

The adjusted parametric model provides a complete 3D representation of the human subject. The parts that were previously occluded, such as the top of the legs in FIG. 1, can instead be estimated using the parametric model, which may represent these parts whilst taking into account e.g. the relative location of e.g. the subject's knee, ankle, waist etc. extracted from the original point cloud. That is, the adjusted parametric model provides an estimate of the points in the point cloud that correspond to at least some (if not all) of the parts of the human subject that were occluded in the at least one colour and depth images. The adjusted parametric model may result in an untextured mesh representing the human subject's body (including their face). An example of such an untextured mesh 402 is shown in FIG. 4.

As noted above, optionally the parametric model could be used iteratively to fill in gaps in a partial point cloud of the subject, thereby refining the point cloud and subsequently the parametric model.

In some cases, the adjusted parametric model may lack accuracy for the regions of the human body that were occluded by clothing. This may be as a result of these regions having been subtracted from the point cloud, prior to the adjustment of the parametric model, meaning that little data was available for use in morphing the parametric model to correspond to those regions. Alternatively, this lack of accuracy may occur because the points corresponding to the clothing were used to adjust the parametric model, and therefore the shape of the human body was estimated using the shape of the clothing, which may not have been representative of the shape of the human subject's body. In either case, this lack of accuracy should not pose a real problem because the human subject's hair, clothes, accessories etc. can be reconstructed separately, and combined with the reconstruction of the human subject, as will be described below.

At step S206, the untextured mesh of the human subject (resulting from the adjusted parametric model) is textured. This may involve, for example, generating a body texture map from the regions of the colour images identified as corresponding to the human subject's skin. For the regions identified as corresponding to clothing, an in-painting operation may be performed. The in-painting operation may correspond to estimating colour values for the human subject's skin at the regions occluded by clothing. The regions corresponding to the human subject's skin and clothing may be identified using the segmentation described previously. Once generated, the body texture map may then be applied to the surface of the untextured mesh.

The in-painting may be performed based on the pixel values of the human subject's body, close to the boundary at which the clothing starts. In some cases, the in-painting may simply involve estimating an average skin tone of the human subject and filling in the regions of the untextured mesh that were occluded by clothing, with the corresponding colours. Generally, it is expected that these parts of the human body will be covered by clothing, and so need not be incredibly accurate in terms of detail and colour.

At step S207, the 3D reconstruction of the human subject is combined with a 3D representation of one or more items. The one or more items may be added as a separate mesh to the textured mesh representation of the human subject. Alternatively, the one or more items may be added as points, which can then be added to the point cloud of the human subject (in this case, representing the adjusted parametric model). The 3D representation may be of the one or more items that were identified as occluding the human subject. Alternatively, the 3D representation may be of different items. In either case, these items may include e.g. clothing, accessories, objects for holding, hair, etc.

In cases where the 3D representation is of an item identified as occluding the human subject, the 3D representation of this item may be generated using the colour and depth information identified as corresponding to that item (in the obtained colour and depth images). This may involve, for example, identifying the points that were discounted from the point cloud that correspond to this item, and generating a mesh of representing the item, from these points. The colour information in the corresponding colour images may then be used to generate a texture for applying to this mesh. In this way, the occluding item can be reconstructed in 3D, having substantially the same shape and colour as the item appeared to the user obtaining the colour and depth images. It may be useful to subtract these points (corresponding to occluding items) from the point cloud prior to generating the 3D reconstruction of the human, so that the 3D reconstruction is not generated so as to take these items into account. This means, for example, that a 3D representation can be overlaid on top of the 3D reconstruction, without the 3D reconstruction already having a shape corresponding to that item. In some examples, the 3D representation may be of the clothes the human subject was wearing during the capture of the colour and depth images. As described previously, the regions corresponding to the clothes may be identified in the colour image(s) via segmentation. The colour and depth information associated with these regions may be used to generate a 3D reconstruction of the clothing. The reconstruction of the clothing may then be overlaid on top of the textured mesh, thereby concealing any parts of the textured mesh that may lack accuracy (for the reasons described previously). In these embodiments, the original colour and depth information may be retained for generating the 3D representation of the clothing. In some cases, there may be colour and depth information missing for at least parts of clothing (or more generally, items) and so colour and depth information for these parts may need to be estimated using the existing colour and depth information.

In some examples, it may be that the human subject is wearing elaborate clothing and an attempt to reconstruct this in 3D would be too computationally expensive. In such a case, the human subject's clothing may be identified as corresponding to a particular type of clothing, e.g. 'leather jacket' or 'dress with long sleeves' and a predetermined 3D representation of that clothing may be selected for combination with the 3D reconstruction of the human subject. In some cases, this pre-determined 3D representation may be adapted, so as to e.g. match the colour of the clothing that was detected in the colour images of the human subject.

In some examples, the reconstruction of the human subject may be combined with a 3D representation of clothing that is different from the clothing that the human subject was wearing during the colour and depth image capture process. This may be desirable where, for example, a person viewing the 3D reconstruction of themselves wishes to see how they would look in a different piece of clothing. This clothing may correspond to clothing that the viewer is interested in purchasing, or simply clothing that is relevant to e.g. a video game in which the human subject is to be represented. The 3D representation of this clothing may be made available through an application or video game, into which a user can import (or generate) the textured mesh representation of themselves. That is, the 3D representation of this clothing may have been generated by an app or video game developer, prior to the generation of the 3D reconstruction of the human subject.

In additional or alternative examples, any objects that the human subject was holding during the capture of the colour and depth images may also be reconstructed in 3D. In the example shown in FIG. 1, this may involve generating a 3D representation of a mug and morphing the textured mesh representation so as to be holding the mug. In simpler examples, the mug may be identified as corresponding to one of a plurality of pre-determined objects for which a 3D representation already exists. The 3D reconstruction of the human subject may therefore be combined with the corresponding pre-existing 3D representation of the detected object.

In yet further examples, an application or video game may provide a user with a plurality of pre-determined items for which 3D representations exist, and the user may be able to select one or more of these to be represented in 3D, with the reconstruction of themselves.

The hair of the human subject will most likely to be too difficult to reconstruct using the colour and depth information obtained from the colour and depth images. Instead, the hair may be generated using texture strips. The texture strips may be selected so as to correspond to the colour and shape of the human's hair detected in the at least one colour image, and applied (e.g. by a games artist) to the head of the 3D reconstruction of the human subject. Alternatively, a user may select a pre-determined 3D representation of a hairstyle, or create their own, for combination with the 3D reconstruction of themselves. Methods for representing hair in 3D (graphically) are known in the art and any of these may be employed in the present method.

In some examples, items such as e.g. a necklace may be identified as being too small or thin to reconstruct in 3D, using the original colour and depth information. For these, a pre-determined 3D representation associated with the item may be used (for example, a thicker chain, or a brooch, or a ruff), or the item may simply omitted from the reconstruction process.

Meanwhile, there is a significant likelihood that the user will be holding an item such as a videogame controller in front of them, thereby at least partially occluding their hands and torso (or other body part). Optionally, the videogame controller may be replace with a pre-determined 3D representation associated with the videogame controller; this may be a suitable reproduction of the controller itself, or an object that the controller notionally represents within the game, such as a sword, phone, gun, steering wheel or the like.

Figure 5:
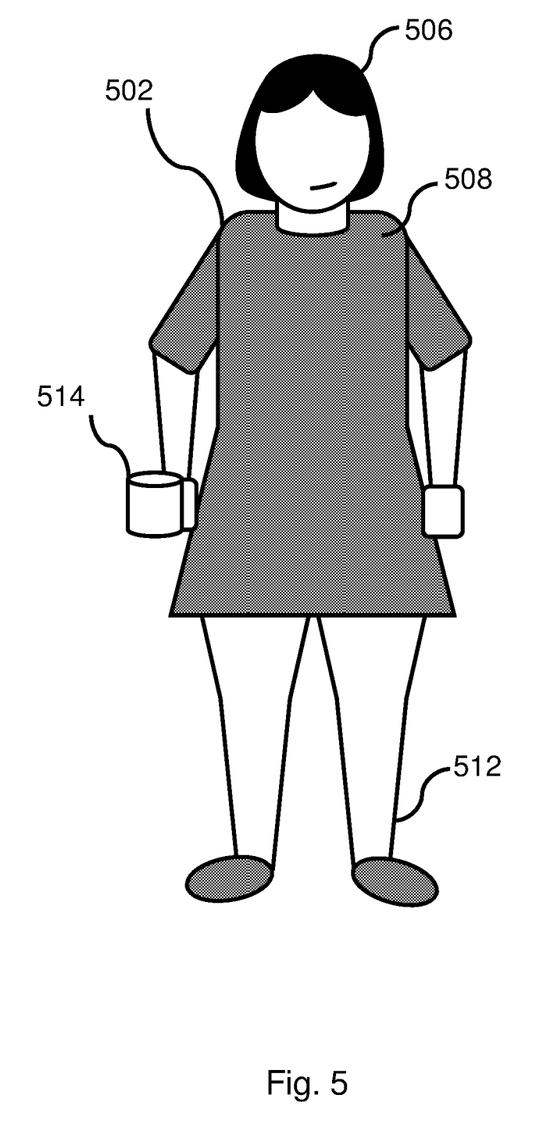
FIG. 5 shows schematically an example of a reconstructed human subject combined with a 3D representation of a plurality of items.

At step S208, the 3D reconstruction of the human subject and the 3D representation of the one or more items, is rendered for display. An example of this is shown in FIG. 5, where it can be seen that the 3D reconstruction of the human 502 subject corresponds in size, shape, and appearance to the representation shown in FIG. 1. However, in FIG. 5, it can be seen that the upper part of the human subject's legs is no longer missing. Moreover, compared with the untextured mesh shown in FIG. 4, the human subject is shown with hair and clothing corresponding to that captured in the colour and depth images. In FIG. 5, the hair 506, clothing 508 and mug 514 correspond to 3D representations that have been applied to the 3D reconstruction of the human subject.

In some embodiments, the 3D reconstruction of the human subject (e.g. in the form of a textured mesh) is stored at a games console. Alternatively, or in addition, the textured mesh may be stored online, e.g. at a server, and made available to the games console via a communications network, such as the internet. The 3D reconstruction of the human subject may then be imported into a specific video game or application being executed at the games console, for use in generating (and subsequently rendering) an avatar of the human subject in that application or game. Here, the term games console may refer to devices that are capable of executing applications or game programs and need not be limited to devices exclusively dedicated to executing game programs.

The video game or application may provide a plurality of different 3D objects that can then be combined with the reconstruction of the human subject. In one example, this may include e.g. armour and weapons that can be added to the 3D reconstruction of the player. In other examples, the 3D representations, such as the clothing that the subject was wearing during the colour and depth image capture process, may also be stored and imported into the application or video game as part of the player's avatar.

Optionally, the reconstruction of the human subject may be mapped to a non-human avatar (for example, mapping how the user's features deviate from an average model to drive deviations from an average model of the non-human avatar, so conferring the users 'likeness' to it), or to a human avatar having significantly different appearance or dress. In this case, if the user's clothing, hair or other items are replaced with a pre-determined 3D representation, then as noted previously herein, this representation may be in keeping with the target avatar's appearance. Hence for example if the user is wearing a necklace, this may be replaced with a dog-tag, iron collar, medallion, ruff, chest tattoo or other item as appropriate to the target avatar. Meanwhile if they are not wearing a necklace, such optionally an item may not be included on the target avatar.

Similarly optionally, other items such as t-shirts, full-sleeve shirts, shorts, trousers, skirts, socks, shoes, watches, bracelets, hair bands, and earrings and the like may be identifiable and have different associated representations appropriate to a target avatar. In this way, a user can influence the appearance of an avatar by how they dress, even if that avatar is not intended to be a direct likeness of the user themselves, or not intended to preserve a direct likeness for their clothing and other items. Hence for example a t-shirt and shorts may correspond to light armour, whilst a sweater and trousers correspond to heavy armour for a knight, causing the user to feel a physical consequence similar to their respective armour choices with the game.

In some examples, the facial expression and motion of the player's limbs may be tracked during the playing or use of a video game or application. These movements and changes in expression may be mapped to the textured mesh representation, and used to morph the representation so as to correspond to the player's actual movements, as they occur. This may help improve the feeling of 'presence' within the video game or application.

Figure 6:
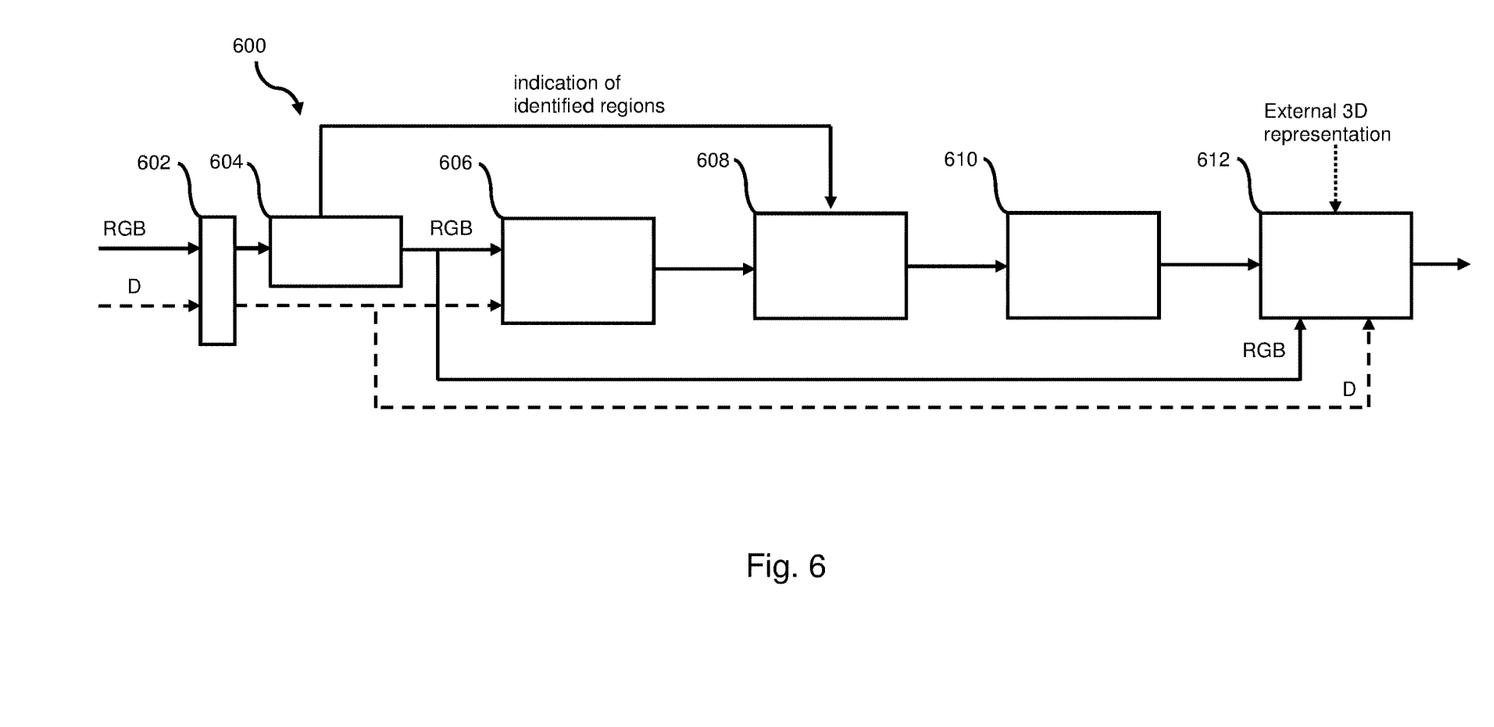
FIG. 6 shows schematically an example of a system in accordance with the present disclosure.

FIG. 6 shows an example of a system 600 for executing the method described previously. The system comprises an input unit 602, image processor 604, point cloud generator 606, subtraction unit 608, morphing unit 610 and image generator 612.

The input unit 602 is configured to obtain at least one colour image and corresponding depth image of a scene. As described previously, the at least one colour image and depth image may be captured by respective colour and depth cameras. In such a case, these images may be received at the input unit from the colour and depth cameras. Alternatively, the at least one depth image may be obtained from a stereoscopic image. In FIG. 6, a colour image and corresponding depth image are shown as respective inputs RGB and D to the input unit. The at least one colour and corresponding depth image of the scene include a human subject that is at least partially occluded by one or more items.

The at least one colour image is provided as an input to the image processor 604. The image processor 604 is configured to identify respective regions in the at least one colour image corresponding to non-occluded parts of the human subject. The image processor 604 may also be configured to identify regions in the at least one colour image that correspond to one or more items occluding the human subject and a background region, such as any e.g. walls or surfaces in the background of the human subject.

The image processor 604 may be configured to input the at least one colour image to a neural network trained to segment pixels corresponding to a human subject from other pixels in images. Additionally or alternatively, the image processor 604 may be configured to perform the image segmentation using cluster analysis, as described previously.

The at least one colour image and depth image are provided as inputs to the point cloud generator 606. The point cloud generator 606 is configured to generate a point cloud from the colour pixels and depth pixels contained in the at least one colour and depth images. As described previously in relation to step S203 (FIG. 2), this may involve determining an inverse projection and applying the inverse projection to the colour and depth pixels in the at least one colour and depth image.

The generated point cloud may be provided as an input to a discount unit 608. The discount unit 608 is configured to identify points in the point cloud that correspond to the one or more items identified as occluding the human subject. In some examples, the discount unit 608 is configured to remove these points from the point cloud (i.e. subtract them). The points corresponding to one or more items points may be identified based on the identification performed at the image processor 604. For example, the mapping between the regions of pixels identified by the image processor 604 to corresponding points in the point cloud may be known, and this mapping may be used to identify (and optionally, remove) the points corresponding to the one or more occluding items. The image processor 604 may be configured to provide the discount unit 608 with an indication of the respective regions in the at least one colour image that were identified (i.e. segmented out from one another). The discount unit 608 may also be configured to remove points identified as corresponding to a background region. Again, this may be based on the identification of those regions by the image processor 604.

As described previously, it may be desirable to perform some depth completion on the parts of the point cloud corresponding to the human subject, but for which depth information is missing. Any of the previously described depth completion may be used by e.g. a depth completion unit (not shown) may be configured to receive the point cloud corresponding to the human subject, and to perform the depth completion thereon.

The points in the point cloud corresponding to the non-occluded parts of the human subject are provided to the morphing unit 610. That is, the points identified as corresponding to the one or more items are discounted from the points provided to the morphing unit 610. The points provided to the morphing unit 610 may correspond to the points remaining in the point cloud, following the subtraction of the points identified as corresponding to the one or more items occluding the human subject. The morphing unit 610 is configured to adjust one or more parameters of a parametric model, based on the points in the point cloud corresponding to the non-occluded parts of human subject. As described previously in relation to step S205 (FIG. 2), the parametric model may define a parametrised shape of a human. The parameters defining the shape of the human may be adjusted so as to morph the model so as to correspond more closely to the shape of the human subject's body (including their face and facial characteristics). The morphing unit 610 may be operable to identify or extract one or more key feature points of the human subject from the points in the point cloud identified as corresponding to the non-occluded parts of the human subject. The morphing unit may then use these to adjust the parameters of the parametric model.

The adjusted parametric model (corresponding to a generic representation of a human morphed so as to correspond more closely to the human subject in the at least one colour and depth images) is provided to the image generator 612. The image generator 612 is configured to generate a 3D reconstruction of the human subject, using the adjusted parametric model.

As described previously (in relation to step S206 in FIG. 2), the 3D reconstruction of the human subject may correspond to an untextured mesh that requires further texturing. In some examples, the system may further comprise a texture map generator (not shown) configured to generate a texture map for applying to the untextured mesh. The texture map generator may be configured to generate the texture map using the colour information contained in the at least one colour image received at the input unit 602. The texture map may be generated in any of the ways described previously in relation to FIG. 2. The image generator 612 may be configured to apply the generated texture map to the 3D reconstruction generated by the image generator 612.

The image generator 612 may be further configured to receive the at least one colour and depth image and to generate 3D representation of the one or more items identified by the image processor, and to generate a 3D representation of those items. In some examples, the 3D representation of the one or more items may be generated using the points discounted from the point cloud by the discount unit 608. The 3D representation may represent the one or more items with the approximate shape and colour that they were detected as having, from the colour and depth images. In FIG. 6, this is indicated with the at least one colour and depth image being received as an input at the image generator 612.

In some cases, the colour and depth information may be incomplete for at least some of the identified items and so an in-painting operation may be needed. It may be, for example, that there were parts of the human subject's clothing for which colour and depth information could not be captured, and so the existing colour and depth information may need to be used to fill-in these parts. The image generator 612 may be configured to perform this in-painting, for example.

The image generator 612 may be configured to combine the 3D representation of the one or more items with the 3D reconstruction of the human subject. This may correspond to having the 3D reconstruction of the human subject wear or hold the one or more items represented in 3D. The subsequent combination of the 3D reconstruction and 3D representation(s) may then be output for display at a display device. The combination of the 3D reconstruction and 3D representations may be displayed as an avatar representing the human subject in an application or video game (as described previously) being executed at a computing device.

As described previously, the 3D reconstruction of the human subject may also be combined with one or more items that were not present in the originally captured colour and depth images. Hence, in some embodiments, the image generator 612 may be configured to receive these 3D representations separately (e.g. from an application or video game) and to output the 3D reconstruction of the human subject wearing and or holding these items. In FIG. 6, these 3D representations are represented by the more finely dashed arrow shown as an input the image generator 612.

The techniques described herein may be implemented in hardware, software or combinations of the two as appropriate. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of generating a three-dimensional (3D) reconstruction of a human, the method comprising:

obtaining at least one colour image and corresponding depth image of a scene, the at least one colour image and corresponding depth image comprising a human subject that is at least partially occluded by one or more items;

identifying in the at least one colour image, regions corresponding to the non-occluded parts of the human subject;

identifying in the at least one colour image, regions corresponding to one or more items occluding the human subject;

generating a point cloud of the scene based on the at least one colour image and corresponding depth image of the scene, the point cloud comprising regions corresponding to the regions identified in the at least one colour image as corresponding to the non-occluded parts of the human subject;

removing, from the point cloud, points corresponding to the one or more items identified as occluding the human subject to thereby obtain a modified point cloud for which the points corresponding to the one or more items identified as occluding the human subject have been removed;

adjusting one or more parameters of a parametric model based on the modified point cloud, the adjusted parametric model providing an estimate of points in the point cloud corresponding to the at least partially occluded parts of the human subject, wherein the parametric model defines a 3D parametrised shape of a human and wherein adjusting the one or more parameters is such that the model is morphed so as to more closely correspond to the human subject; and generating a 3D reconstruction of the human subject based on the adjusted parametric model.

2. The method according to claim 1, wherein the one or more items identified in the colour image correspond to at least one of:
   i. clothing that is being worn by the human subject;
   ii. objects being held by the human subject; and
   iii. hair on the human subject's face and or body.

3. The method according to claim 1, comprising:
   generating a 3D representation of at least one of the identified items; and
   combining the 3D representation of the at least one identified item with the 3D reconstruction of the human subject.

4. The method according to claim 3, wherein the 3D representation of the at least one identified item is generated using at least some of the points discounted from the point cloud.

5. The method according to claim 3, wherein generating a 3D representation of the at least one identified item comprises:
   identifying a pre-determined 3D representation associated with the at least one identified item; and
   selecting the pre-determined 3D representation for combination with the 3D reconstruction of the human subject.

6. The method according to claim 3, comprising rendering the combination of the 3D reconstruction of the human subject and the 3D representation associated with the at least one item, for display.

7. The method according to claim 1, comprising estimating depth information for at least some of the human subject, subsequent to the discounting of the points corresponding to the one or more items identified as occluding the human subject.

8. The method according to claim 1, wherein the 3D reconstruction of the human subject comprises an untextured mesh representation of the human subject, the method comprising:
   generating a texture map of the human subject, based on the regions in the at least one colour image identified as corresponding to the non-occluded parts of the human subject; and
   applying the generated texture map to the 3D reconstruction of the human subject.

9. The method according to claim 8, wherein identifying the human subject and one or more items in the colour image comprises at least one of:
   i. inputting the colour image to a neural network trained to perform segmentation of images of human subjects; and
   ii. performing cluster analysis on the at least one colour image.

10. A non-transitory, computer readable medium having a computer program comprising computer-implemented instructions stored thereon which, when run on a computer, cause the computer to implement a method of generating a three-dimensional (3D) reconstruction of a human, the method comprising:
    obtaining at least one colour image and corresponding depth image of a scene, the at least one colour image and corresponding depth image comprising a human subject that is at least partially occluded by one or more items;
    identifying in the at least one colour image, regions corresponding to the non-occluded parts of the human subject;
    identifying in the at least one colour image, regions corresponding to one or more items occluding the human subject;
    generating a point cloud of the scene based on the at least one colour image and corresponding depth image of the scene, the point cloud comprising regions corresponding to the regions identified in the at least one colour image as corresponding to the non-occluded parts of the human subject;
    removing, from the point cloud, points corresponding to the one or more items identified as occluding the human subject to thereby obtain a modified point cloud for which the points corresponding to the one or more items identified as occluding the human subject have been removed;
    adjusting one or more parameters of a parametric model based on the modified point cloud, the adjusted parametric model providing an estimate of points in the point cloud corresponding to the at least partially occluded parts of the human subject, wherein the parametric model defines a 3D parametrised shape of a human and wherein adjusting the one or more parameters is such that the model is morphed so as to more closely correspond to the human subject; and
    generating a 3D reconstruction of the human subject based on the adjusted parametric model.

11. A system for generating a three-dimensional reconstruction of a human the system comprising:
    an input unit configured to obtain at least one colour image and corresponding depth image of a scene, the at least one colour image and corresponding depth image comprising a human subject that is at least partially occluded by one or more items;

an image processor configured to identify respective regions in the at least one colour image corresponding to non-occluded parts of the human subject;

a discount unit configured to identify in the at least one colour image, regions corresponding to one or more items occluding the human subject;

a point cloud generator configured to receive the at least one colour image and corresponding depth image and to generate, based thereon, a point cloud of the scene, the point cloud comprising regions corresponding to the regions in the at least one colour image identified as corresponding to the non-occluded parts of the human subject;

wherein the discount unit is configured to remove, from the point cloud, points corresponding to the one or more items identified as occluding the human subject to thereby obtain a modified point cloud for which the points corresponding to the one or more items identified as occluding the human subject have been removed;

a morphing unit configured to adjust one or more parameters of a parametric model based on the modified point such that the parametric model is morphed so as to more closely correspond to the human subject, the parametric model defining a 3D parametrised shape of a human subject, wherein the adjusted parametric model provides an estimate of points in the point cloud corresponding to the at least partially occluded parts of the human subject; and an image generator operable to generate a 3D reconstruction of the human subject, based on the adjusted parametric model.

12. A system according to claim 11, wherein the image generator is configured to combine the 3D representation of the one or more items with the 3D reconstruction of the human subject; and wherein the image generator is configured to output the 3D representation of the one or more items and the 3D reconstruction of the human subject for display.

13. A system according to claim 11, comprising: a texture map generator operable to generate a texture map for applying to the 3D reconstruction of the human subject, the texture map being generated based on the regions in the at least one colour image identified as corresponding to the non-occluded parts of the human subject.

14. A system according to claim 11, wherein the image generator is configured to select one of a plurality of pre-determined 3D representations for combining with the 3D reconstruction of the human subject.

15. A system according to claim 11, wherein the image processor is configured to input the at least one colour image to a neural network trained to segment pixels corresponding to a human subject from other pixels in images of human subjects.

* * * * *